(12) United States Patent
Doerr

(10) Patent No.: US 8,280,254 B2
(45) Date of Patent: Oct. 2, 2012

(54) OPTICAL INTERLEAVERS AND DE-INTERLEAVERS

(75) Inventor: Christopher Richard Doerr, Middletown, NJ (US)

(73) Assignee: Alcatel Lucent, Paris (FR)

( * ) Notice: Subject to any disclaimer, the term of this patent is extended or adjusted under 35 U.S.C. 154(b) by 710 days.

(21) Appl. No.: 12/383,159

(22) Filed: Mar. 20, 2009

(65) Prior Publication Data

US 2010/0239248 A1 Sep. 23, 2010

(51) Int. Cl.
*H04J 14/02* (2006.01)
*G02B 6/28* (2006.01)
*G02B 6/26* (2006.01)

(52) U.S. Cl. ............... 398/79; 398/82; 385/24; 385/46

(58) Field of Classification Search .................. 398/43, 398/79, 82; 385/24, 39, 46
See application file for complete search history.

(56) References Cited

U.S. PATENT DOCUMENTS

| | | | |
|---|---|---|---|
| 5,745,618 A | 4/1998 | Li | 385/46 |
| 6,049,640 A | 4/2000 | Doerr | |
| 6,832,027 B2 | 12/2004 | Wada et al. | 385/37 |
| 6,882,778 B2 | 4/2005 | Fondeur et al. | 385/37 |
| 2002/0048065 A1 | 4/2002 | Shani | 359/127 |
| 2002/0150329 A1 | 10/2002 | Ahn et al. | |
| 2002/0159675 A1 | 10/2002 | Huang et al. | |
| 2003/0128928 A1 | 7/2003 | Wada et al. | 385/37 |
| 2003/0194183 A1 | 10/2003 | Fondeur et al. | 385/37 |
| 2007/0206898 A1 | 9/2007 | Wang et al. | 385/24 |
| 2008/0100837 A1 | 5/2008 | De Boer et al. | 356/326 |
| 2008/0152353 A1 | 6/2008 | De Boer et al. | 398/159 |
| 2008/0170225 A1 | 7/2008 | De Boer et al. | 356/327 |

FOREIGN PATENT DOCUMENTS

WO  WO 02/33465 A1  4/2002
WO  WO 03/052475 A1  6/2003

OTHER PUBLICATIONS

Ding-wei Huang et al., "Arrayed Waveguide Grating DWDM Interleaver", *Optical Society of America*, Optical Fiber Communication Conference and Exhibit, 2001, vol. 3, pp. WDD80-1-WDD80-3.
S. Cao et al., "Interleaver Technology: Comparisons and Applications Requirements" *Journal of Lightwave Technology*, vol. 22, No. 1, Jan. 2004, pp. 281-289.
M.K. Smit, "New Focusing and Dispersive Planar Component Based on an Optical Phased Array", *Electronics Letters*, vol. 24, No. 7, Mar. 31, 1988, pp. 385-386.
H. Takahaski et al., "Arrayed-Waveguide Grating for Wavelength Divison Multi/Demultiplexer With Nanometre Resolution" *Electronics Letters*, vol. 26, No. 2, Jan. 18, 1990, pp. 87-88.

(Continued)

*Primary Examiner* — Jack Dinh
(74) *Attorney, Agent, or Firm* — J. F. McCabe

(57) ABSTRACT

An apparatus includes one or more optical de-interleavers. Each optical de-interleaver includes an optical component having a first pair of optical input and output ports and a second pair of optical input and output ports and a 1×2 optical coupler. Each optical output port of the optical component is optically connected to a corresponding optical port of the 1×2 optical coupler. The optical component is constructed to operate as a first optical filter for light propagating between the optical ports of the first pair and is constructed to operate as a second optical filter for light propagating between the optical ports of the second pair. The first and second optical filters have substantially regularly spaced and interleaved passbands.

19 Claims, 11 Drawing Sheets

OTHER PUBLICATIONS

C. Dragone et al., "Integrated Optice N X N Multiplexer on Silicon", *IEEE Photonics Technology Letters*, vol. 3, No. 10, Oct. 1991, pp. 896-899.

C.R. Doerr et al., "Integrated Band Demultiplexer Using Waveguide Grating Routers", *IEEE Photonics Technology Letters*, vol. 15, No. 8, Aug. 2003, pp. 1088-1090.

C.R. Doerr et al., "16-Band Integrated Dynamic Gain Equalization Filter With Less Than 2.8-dB Insertion Loss", IEEE Photonics Technology Letters, vol. 14, No. 3, Mar. 2002, pp. 334-336.

K. Takada et al., "Beam-adjustment-free crosstalk reduction in 10GHz-spaced arrayed-waveguide grating via photosensitivity under UV laser irradiation throughout metal mask", *Electronics Letters*, vol. 36, No. 1, Jan. 6, 2000, pp. 60-61.

PCT International Search Report dated Aug. 31, 2010 (PCT/US2010/026750) 3 pages.

OPTICAL INTERLEAVERS AND DE-INTERLEAVERS

BACKGROUND

1. Technical Field

The invention relates to apparatus with an optical interleaver and de-interleaver and methods to operate such optical components.

2. Discussion of the Related Art

This section introduces aspects that may be helpful to facilitating a better understanding of the inventions. Accordingly, the statements of this section are to be read in this light and are not to be understood as admissions about what is prior art or what is not the prior art.

In wavelength-division-multiplexed (WDM) optical communications systems, data rates may be increased by packing more independent wavelength-channels in the selected optical transmission band. Such tighter packing results in narrower wavelength-channels. The narrower wavelength channels may be used with more spectrally efficient modulation formats, e.g., phase-shift keying formats and/or polarization multiplexing formats. The processing of such narrower wavelength-bands in a WDM system typically requires optical filters with narrower bandpasses.

SUMMARY

Various embodiments provide apparatus that can function as optical interleavers and de-interleavers. In some such embodiments, the apparatus provide more rectangular passbands than conventional optical devices having approximately Gaussian passbands. Some such embodiments of optical interleavers and de-interleavers may produce group delays with flatter wavelength-dependencies than many conventional optical interleavers and de-interleavers.

One embodiment features a first apparatus that includes one or more optical de-interleavers. Each optical de-interleaver includes an optical component having a first pair of optical input and output ports and a second pair of optical input and output ports and a 1×2 optical coupler. Each optical output port of the optical component is optically connected to a corresponding optical port of the 1×2 optical coupler. The optical component is constructed to operate as a first optical filter for light propagating between the optical ports of the first pair and is constructed to operate as a second optical filter for light propagating between the optical ports of the second pair. The first and second optical filters have substantially regularly spaced and interleaved passbands.

In some embodiments of the first apparatus, the 1×2 optical coupler is capable of operating as an optical intensity splitter.

In some embodiments of the first apparatus, the optical component includes a first AWG optical MUX capable of transmitting light from two optical ports thereof to an array of ends of optical waveguides end-coupled to an optical star coupler of the first AWG optical MUX. In some such embodiments, the optical component may include a second AWG optical MUX capable of transmitting light from other ends of the optical waveguides of the array to two optical ports of the second AWG optical MUX. The first AWG optical MUX may include another optical star coupler and an AWG connecting the two optical star couplers, and the array of ends may subtend a maximal radian angle with respect to ends of optical waveguides of less than or equal to about 1.55 micrometers divided by twice an average center-to-center spacing of the ends of the optical waveguides of the AWG in micrometers and divided by the effective refractive index of the waveguides of the AWG.

In some embodiments, the first apparatus includes an optical cross connect or an optical add drop multiplexer including the one or more optical de-interleavers. The one or more optical de-interleavers includes two optical de-interleavers. In some such embodiments, the apparatus includes a multi-span optical fiber transmission line, wherein the line includes the optical cross connect or optical add drop multiplexer.

Another embodiment features a second apparatus that includes a first AWG optical MUX including an array of optical ports coupled to two optical ports and a second AWG optical MUX including an array of optical ports coupled to two optical ports. The optical ports of the arrays of the first and second AWG optical MUXs are connected in a one-to-one manner. The second apparatus also includes a 2×1 optical coupler having a first optical port connected to one of the two optical ports of the first AWG optical MUX and having a second optical port connected to the other of the two optical ports of the first AWG optical MUX.

In some embodiments of the second apparatus, the first and second AWG optical MUXs are connected such that passbands for light propagating between a first of the two optical ports of the second AWG optical MUX and a first of the two optical ports of the first AWG optical MUX interleave between passbands for light propagating between a second of the two optical ports of the second AWG optical MUX and a second of the two optical ports of the first AWG optical MUX.

In some embodiments, the second apparatus includes an optical cross connect or an optical add drop multiplexer including the first and second AWG optical MUXs and the 2×1 optical coupler. The second apparatus may include a multi-span optical fiber transmission line, wherein the multi-span optical transmission fiber line includes the optical cross connect or optical add drop multiplexer.

Another embodiment features a first method that includes transmitting a first light signal to an optical input of a first optical filter, transmitting a second light signal to an optical input of a second optical filter, and combining the light signals output by the first and second filters in response to the transmission of the first and second light signals thereto. The first optical filter substantially blocks light in even-indexed spectral windows of a sequence of consecutively indexed adjacent spectral windows and transmits light odd-indexed windows of the sequence. The second optical filter substantially blocks light in the odd-indexed spectral windows of the sequence and transmits light in the even-indexed windows of the sequence.

In some embodiments of the first method, the first light signal has a nonzero intensity in some of the odd-indexed spectral windows of the sequence, and the second light signal has a nonzero intensity in ones of the even-indexed spectral windows interleaved with the some of the odd-indexed spectral windows.

In some embodiments of the first method, the spectral windows have substantially equal widths.

In some embodiments of the first method, the first and second transmitting steps include transmitting the light signals through a same serially concatenated pair of AWG optical MUXs.

Another embodiment features a second method that includes intensity splitting a received light beam into first and second light beams with an optical intensity splitter. The second method also includes filtering the first light beam to remove light in a set of even-indexed spectral windows of a sequence therefrom and to pass light in some of odd-indexed spectral windows of the sequence. The second method includes filtering the second light beam to remove light in the odd-indexed spectral windows of the sequence therefrom and to pass light in some of the even-indexed spectral windows of the sequence. The even-indexed and odd-indexed spectral windows form a sequence of consecutively-indexed adjacent spectral windows. The some of the even-indexed spectral windows are interleaved with the some of the odd-indexed spectral windows.

intensity splitting a received light beam into first and second light beams with an optical intensity splitter. The second method also includes filtering the first light beam to remove light in a set of even-indexed spectral windows therefrom and to pass light in some of the odd-indexed spectral windows and filtering the second light beam to remove light in the odd-indexed spectral windows therefrom and to pass light in some of the even-indexed spectral windows. The even-indexed and odd-indexed spectral windows form a sequence of consecutively-indexed spectral windows, and the some of the even-indexed spectral windows are interleaved with the some of the odd-indexed spectral windows.

In some embodiments of the first method, different ones of the spectral windows have about the same frequency-width or have about the same wavelength-width.

In some embodiments of the first method, the filtering steps include transmitting the first and second light beams to a same serially concatenated pair of AWG optical MUXs.

In the Figures, the relative dimensions of some features may be exaggerated to more clearly illustrate apparatus therein.

In the Figures, similar reference numbers and symbols indicate elements and features with similar forms and/or functions.

Herein, various embodiments are described more fully by the Figures and the Detailed Description of Illustrative Embodiments. Nevertheless, the inventions may be embodied in various forms and are not limited to the specific embodiments described in the Summary, the Figures, and the Detailed Description of the Illustrative Embodiments.

DESCRIPTION OF THE ILLUSTRATIVE EMBODIMENTS

Figure 1:
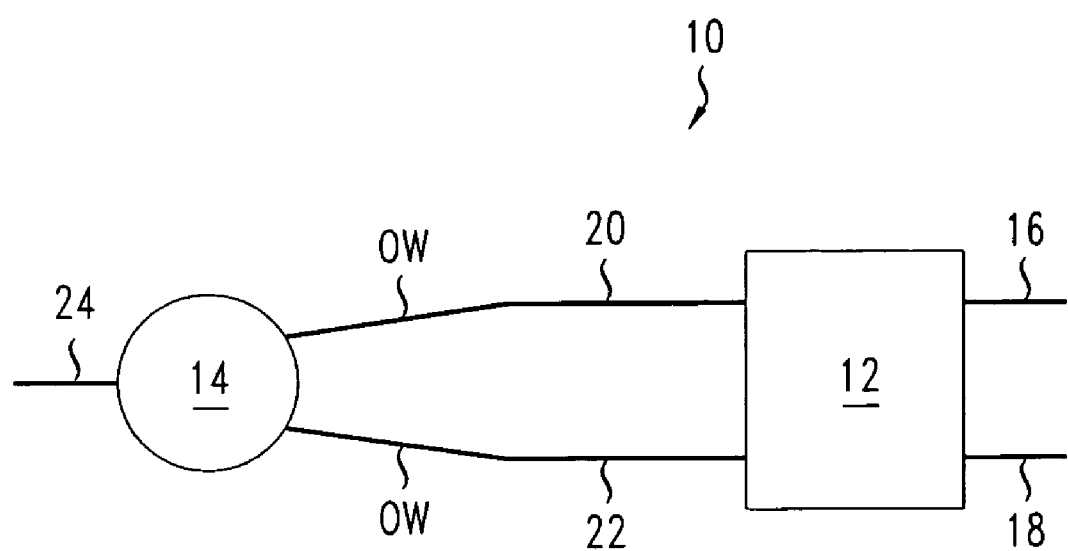
FIG. 1 is a block diagram schematically illustrating an optical interleaver and de-interleaver.

FIG. 1 schematically illustrates an optical apparatus 10 for performing optical interleaving or de-interleaving. The apparatus 10 includes an optical component 12 and a 2×1 or 1×2 optical coupler 14. The optical component 12 operates as a first optical filter with optical ports 16, 20 and a second optical filter with optical ports 18, 22, e.g., passive optical elements. In the optical component 12, the first and second optical filters may share some of the same physical structures, e.g., planar integrated optical structures. One optical port 20, 22 of the each of the optical filters connects via an optical waveguide (OW) to a corresponding one of the paired optical ports of the 2×1 or 1×2 optical coupler 14. The 2×1 or 1×2 optical coupler may be an optical intensity splitter capable of transmitting part of the light intensity received on the unpaired optical port 24, e.g., about 50%, to each of its paired optical ports, which connect to the optical ports 20, 22 of the optical component 12.

In some embodiments, the apparatus 10 of FIG. 1 may be fabricated as a planar integrated optical device.

In the optical component 12, the first and second optical filters have optical passbands that are periodic or about periodic in frequency. In addition, the passbands of the first and second optical filters are interleaved in frequency.

Figure 2:
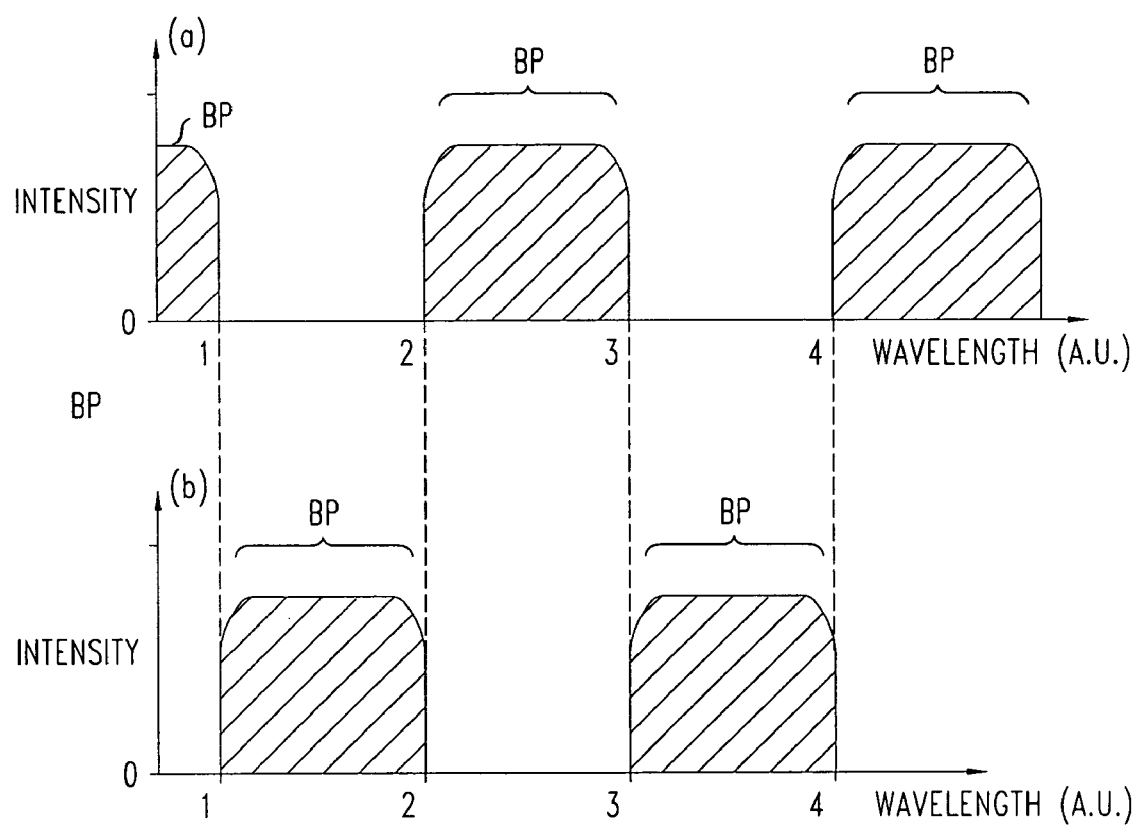
FIG. 2, part a and part b, qualitatively illustrate light intensity responses of the respective first and second effective optical filters of one example of the optical interleaver and de-interleaver of FIG. 1.
Figure 3:
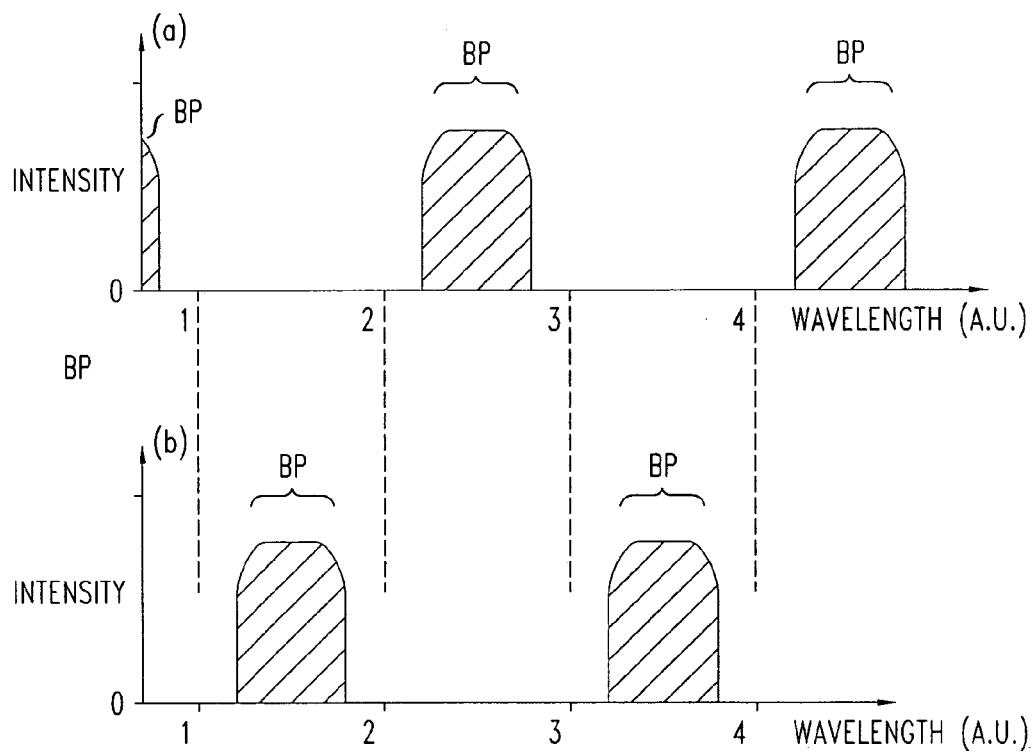
FIG. 3, part a and part b, qualitatively illustrate light intensity responses of the of the respective first and second effective optical filters of another example of the optical interleaver and de-interleaver of FIG. 1.

Example optical responses for embodiments of the first and second optical filters are qualitatively illustrated in FIG. 2 by part a and part b, respectively, and in FIG. 3 by part a and part b, respectively.

In each optical filter, the bandpass regions BP may have about the same frequency or wavelength width and may be about regularly spaced in frequency or wavelength, e.g., equal width and periodically spaced.

In each optical filter, the bandpass regions BP may have either full or partial frequency duty cycles. In embodiments where the optical filters have full duty cycles, the sum of the spectral responses of the two optical filters may substantially cover a contiguous frequency interval that includes multiple bandpass regions BP for each optical filter, e.g., as illustrated in FIG. 2. In embodiments where one or both of the optical filters have partial duty cycles, the sum of the spectral responses of the two optical filters may include substantial gaps between neighboring spectral bandpass regions of the two optical filters, e.g., as illustrated in FIG. 3. Also, the percentage duty cycles of the bandpass regions BP in the spectral responses of the first optical filter and the second optical filter may be the same or may differ.

The first optical filter transmits light substantially only in spectral regions where the second optical filter does not significantly transmit light so that the bandpass regions BP of the first and second optical filters are interleaved in frequency. That is, the first and second optical filters transmit light in respective odd-indexed spectral windows of a sequence and even-indexed spectral windows of the sequence, wherein the sequence is a consecutively integer-indexed sequence of adjacent spectral windows.

The 2×1 or 1×2 optical coupler 14 optically combines light received from the optical ports 20, 22 to produce a single light beam therefrom at optical port 24, e.g., the optical combiner 14 passively and simultaneously combines said received light. The combining frequency interleaves optical signal streams input to the optical ports 16 and 18 in the light beam output from the optical port 24 if the optical signal streams input into the optical port 16 and 18 include wavelength channels aligned with the optical passbands of the respective first and second optical filters.

Likewise, the apparatus 10 optically de-interleaves light input to optical port 24 of the 2×1 or 1×2 optical coupler 14. In particular, the apparatus 10 transmits input light within passbands of the first optical filter to the optical port 16 and transmits input light within passbands of the second optical filter to the optical port 18. Thus, if the passbands of the optical filters are consecutively inter-indexed as described above, the apparatus 10 transmits input light in the odd-indexed passbands to the optical port 16 and transmits input light in the even-indexed passbands to the optical port 18.

From the above-description, it would be clear to a person of skill in the art that the apparatus 10 can be operated as either an optical de-interleaver or an optical interleaver. Herein, it is assumed that an optical de-interleaver can also function as an optical interleaver. Thus, the designations of optical interleaver and optical de-interleaver will be used interchangeably and may refer to the same component.

Figure 4:
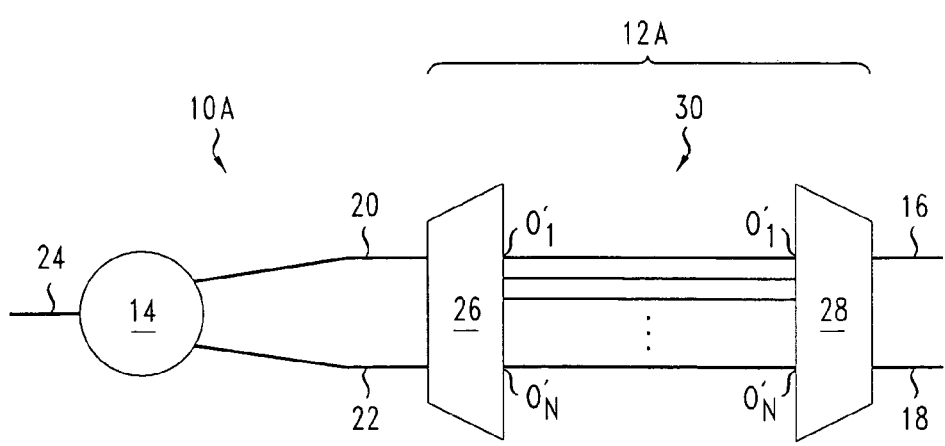
FIG. 4 is a block diagram illustrating an array waveguide grating (AWG) example of the optical interleaver and de-interleaver of FIG. 1.

FIG. 4 illustrates one example embodiment 10A of the apparatus 10 illustrated in FIG. 1. The apparatus 10A includes a 2×1 or 1×2 optical intensity coupler 12 and an optical component 12A. The optical component 12A includes structures that function as a first optical filter with optical ports 16, 20 and a second optical filter with optical ports 18, 22. The optical component 12A includes first and second AWG optical multiplexers (MUXs) 26, 28 and an AWG optical "lens" 30. Here, the expression "lens" refers to an optical component that transports an optical field distribution from one location to another with an array of optical waveguides of equal or about optical path length.

Figure 5A:
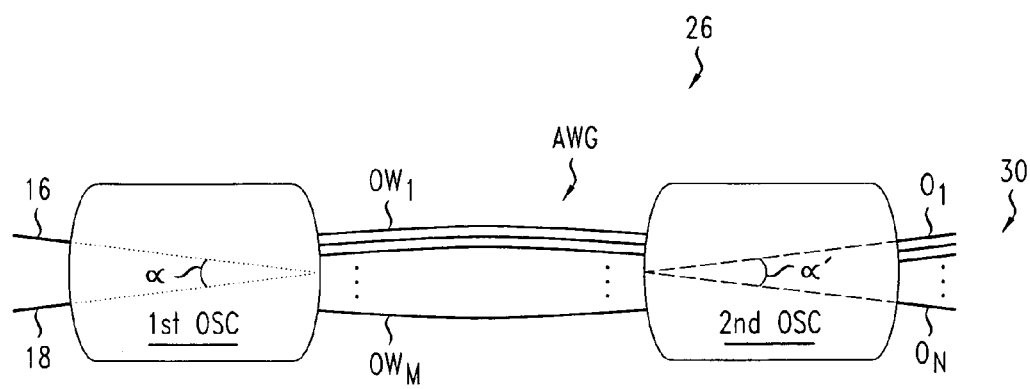
FIGS. 5A and 5B are block diagrams illustrating examples of AWG multiplexers (MUXs) for the optical component illustrated in FIG. 4.
Figure 5B:
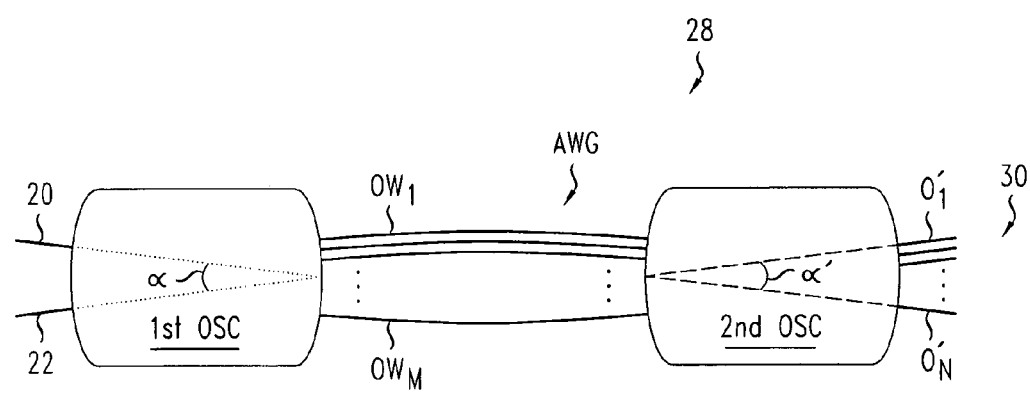

FIGS. 5A and 5B illustrate end-parts of the AWG optical lens 30 and the AWG optical MUXs 26, 28. Each AWG optical MUX 26, 28 includes first and second optical star couplers (OSCs) and an AWG with M optical waveguides. The M optical waveguides of the AWG connect an input surface of one OSC to an output surface of the other optical star coupler OSC in the same AWG optical MUX 26, 28. Each AWG optical MUX 26, 28 routes light between a pair of external optical ports (16, 18) or (20, 22) on one side thereof and an array of N optical ports on the other side thereof.

The AWG optical lens 30 has N optical waveguides $O_1, \ldots, O_N$, e.g., of equal or about equal optical length. Each optical waveguide connects a corresponding optical port of the array of N external optical ports of the first AWG optical MUX 26 to a corresponding port of the set of N external optical ports of the second AWG optical MUX 28.

In each AWG optical MUX 26, 28, the pair of optical ports 16, 18 or 20, 22 are on a part of a cylindrical surface of the first OSC and are optically coupled via the first OSC to first ends of the optical waveguides $OW_1, \ldots, OW_M$ of the AWG. The array of N optical ports $O_1, \ldots, O_N$ or $O'_1, \ldots, O'_N$ are on a cylindrical surface of the second OSC and are optically coupled via the second OSC to second ends of the optical waveguides $OW_1, \ldots, OW_M$ of the AWG.

In each AWG optical MUX 26, 28, laterally adjacent optical waveguides $OW_1, \ldots, OW_M$ of the AWG differ in length or optical path length by about ΔL, and the optical path lengths of the optical waveguides $OW_1, \ldots, OW_M$ of the AWG linearly increase from one lateral side of the AWG to the other lateral side thereof. The constant length or optical path length increase ΔL between laterally adjacent optical waveguides $OW_1, \ldots, OW_M$ of the AWG causes the AWG optical MUXs 26, 28 to have frequency periodic properties, where the frequency periodicity or free spectral range (FSR) satisfies:

$$FSR = V_{eff}/\Delta L.$$

Here, $V_{eff}$ is the effective propagation speed of light in the optical waveguides $OW_1, \ldots, OW_M$ of the AWG.

The FSR of the AWG optical MUXs 26, 28 defines approximate frequency periodicities of the first and second optical filters in the optical interleaver and de-interleaver 10A. In particular, FSR is also the frequency periodicity and interleaving period of the optical responses of the first and second optical filters that correspond to optical port pairs (16, 20) and (18, 22), respectively. Also, in embodiments where the first and second optical filters have full duty cycles, those duty cycles will typically be FSR/2. Thus, the value of ΔL for the AWGs determines the upper value for frequency bandpass widths and the value for the frequency interleaving period in the apparatus 10A of FIG. 4.

In each AWG optical MUX 26, 28, the external optical ports, i.e., pair (16, 18) or pair (20, 22), are located on cylindrical surfaces of a first OSC, and the ends of the optical waveguides $O_1, \ldots, O_N$ of the AWG optical lens 30 are located on cylindrical surfaces of a second OSC. The first OSC optically couples the external optical ports 16, 18, 20, 22 to the array of first ends of the optical waveguides $OW_1, \ldots, OW_M$ of the AWG in the AWG optical MUX 26, 28. The second OSC optically couples an array of ends of the optical waveguides $O_1, \ldots, O_N$ of the AWG optical lens 30 to the array of second ends of the optical waveguides $OW_1, \ldots, OW_M$ of the AWG of the AWG in the AWG optical MUX 26, 28.

In the first OCS, each pair of external optical ports (16, 18) and (20, 22) subtends an angle α with respect to the ends of the optical waveguides $OW_1, \ldots, OW_M$ of the AWG that are on a facing surface of the same OSC. For small values, the angle α should typically either be about equal to or less than λ/[2a] radians or be about equal to or less than λ/[2a·n] radians. Here, λ is a center wavelength of the light being interleaved or de-interleaved, "a" is equal to or about equal to the center-to-center spacing between optical waveguides $OW_1, \ldots, OW_M$ of the AWG at their intersection with the circular surface of the optical star coupler OSC, and n is an effective refractive index of the optical waveguides $OW_1, \ldots, OW_M$.

In the second OSC, the array of ends of the optical waveguides $O_1, \ldots, O_N$ of AWG optical lens 30 subtend an angle α' that should typically either be about equal to or less than λ/[2a] or be about equal to or less than λ/[2a·n] at the ends of the optical waveguides $OW_1, \ldots, OW_M$ of the AWG. For small angles, bN≦Lλ/[2a] or bN≦Lλ/[2a·n] where "b" is the center-to-center spacing of the ends of the optical waveguides $O_1, \ldots, O_N$ of the AWG optical lens 30 at the surface of the second OSC, and N is the number of said optical waveguides $O_1, \ldots, O_N$. The value of the subtended angle $\alpha'$ should be suitable to ensure that the AWG optical lens 30 captures about ½ or less of the angular width of the primary diffraction peak produced by light from the optical waveguides $OW_1, \ldots, OW_M$ of the AWG at the wavelength band at which the apparatus 10A functions as an optical de-interleaver and interleaver, e.g. at an optical wavelength of about 1.55 micrometers, over the optical telecommunications C-band, and/or over the optical telecommunications F-band.

Figure 6:
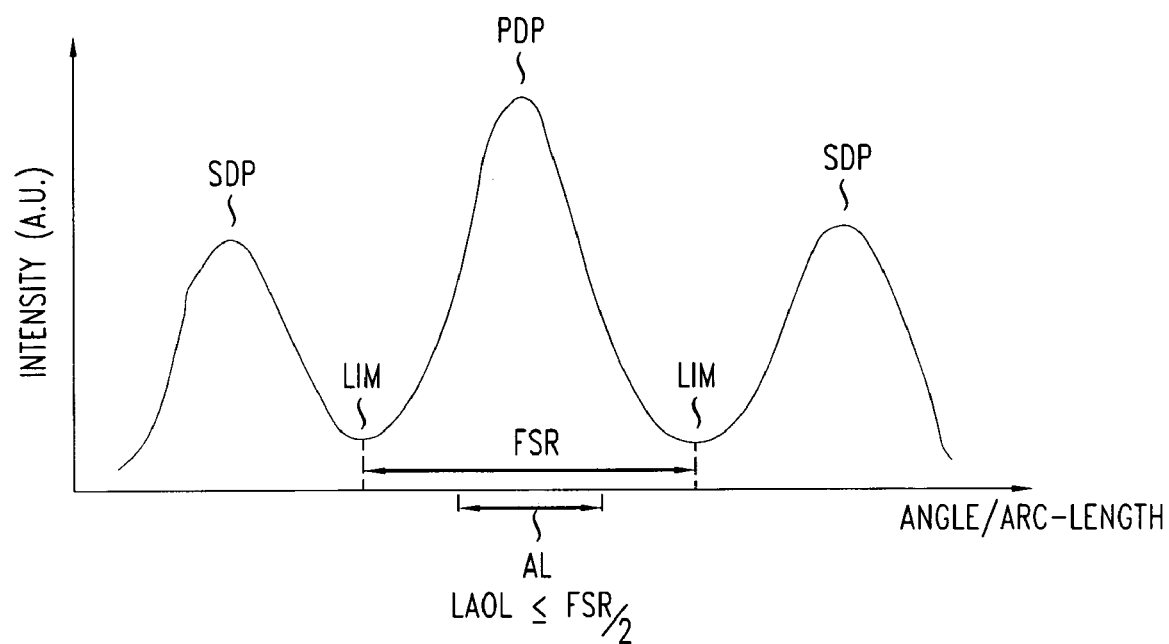
FIG. 6 qualitatively illustrates a potential intensity distribution of light from the AWG gratings at the array of ends of the optical waveguides of the AWG optical lens in FIG. 5a and/or 5b.

FIG. 6 qualitatively illustrates light intensities in a diffraction pattern that might be formed by light from the AWG at the array of ends of the optical waveguides $O_1, \ldots, O_N$ of the AWG optical lens 30 when the grating arms are illuminated from one of the external optical ports 16, 18, 20, or 22. The diffraction pattern has a primary diffraction peak PDP, secondary diffraction peaks SDP, and light intensity minima LIM between the primary diffraction peak PDP and each secondary diffraction peak SDP. The ends of the optical waveguides $O_1, \ldots, O_N$ of the AWG optical lens 30 are located along a cylindrical surface of the second OSC of arc-length AL where AL is less than or equal to about half of the arc-distance between the LIMs on said cylindrical surface. Since the distance between the LIMs corresponds to a wavelength FSR, AL≦FSR/2 in appropriate units. For such a configuration, only about half or less of the frequency or wavelength spread of the primary diffraction order of the light from the AWG is captured by the AWG optical lens 30. For that reason, the AWG optical lens 30 will receive light in passbands whose frequency or wavelength widths are about half or less of the appropriate free spectral range FSR of the AWG. That is, the subtended angle $\alpha'$ determines the widths of the passband regions PB of the first and second optical filters in the optical component 12A, and $\alpha'$ is selected to provide for interleaving of the passband regions of said optical filters.

Figure 5C:
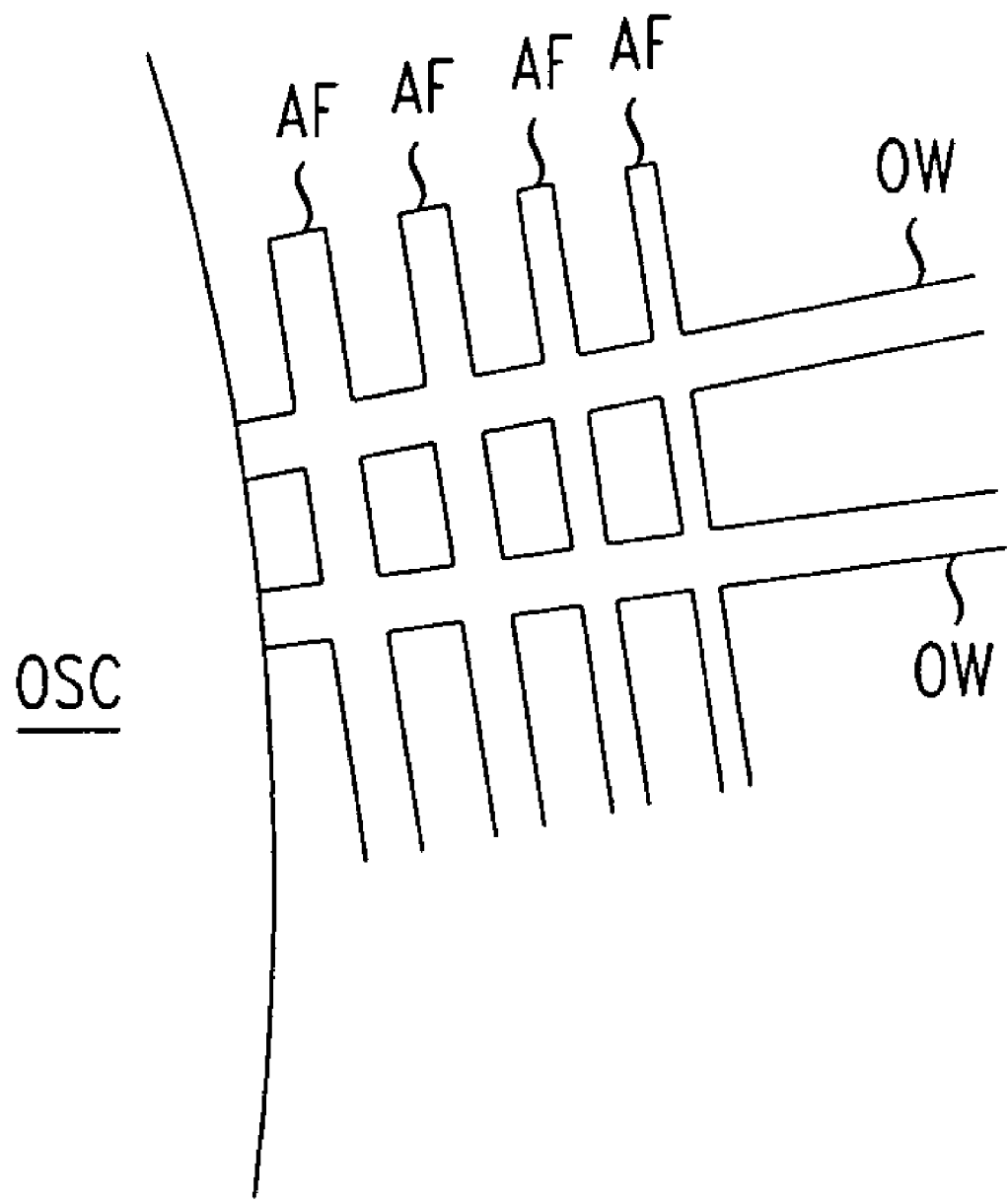
FIG. 5C is a top view illustrating a structure for the end-coupling surfaces of the optical star couplers and the end portions of the optical waveguides of the AWGs and the AWG optical lens connecting thereto in the optical component of FIGS. 4 and 5A-5B.

In some embodiments of the AWG optical MUXs 26, 28, the cylindrical-like coupling surfaces of the OSCs and the ends of the optical waveguides (OWs) of the AWGs and AWG optical lens 30 may be patterned as illustrated in FIG. 5C. The patterning includes forming an array of cross-connecting annular features (AFs) between end portions of the adjacent optical waveguides OW in the regions near said cylindrical coupling surfaces of the OSCs. Each AF may be constructed to have thicknesses that decrease linearly with distance from the adjacent OSC. The array may have 5-20 such annular features AF and the thickness of such annular features AF may vary by a factor of 2-5 over such an array. Such arrays of cross-connecting annular features AF can increase the mutual coupling between the ends of the optical waveguides OW in an adiabatic manner and hence reduce the optical insertion loss of the optical filters in the optical component 12A.

Structures and methods for producing such mutual coupling between the end portions of optical waveguides of AWGs and AWG structures are described, e.g., in U.S. Pat. No. 5,745,618, which is incorporated herein by reference in its entirety. The structures and methods of this U.S. patent may be used to pattern the cylindrical coupling surfaces of the OSCs and the optical waveguides of the AWGs and the AWG optical lens 30 in the apparatus 10A illustrated in FIGS. 4, 5A, and 5B.

Referring to FIGS. 4 and 5A-5B, the 2×1 optical intensity coupler 12 and optical component 12A may be fabricated as a planar integrated optical, e.g., with doped and undoped silica glasses. In one such embodiment, optical core layers of the optical waveguides and the OSCs have a thickness of about 6 micrometers, optical waveguides have widths of about 5.8 micrometers, and optical core-to-cladding index contrasts are about 0.8%. In some such embodiments, ends of optical waveguides $OW_1, \ldots, OW_M$ of the AWGs have center-to-center separations of about 10 micrometers, i.e., the parameter "a", ends of the optical waveguides $O_1, \ldots, O_N$ of the AWG optical lens 30 have center-to-center separations of about 11 micrometers, i.e., the parameter "b", the AWGs have about 14 optical waveguides $OW_1, \ldots, OW_M$, i.e., M=14, the AWG optical lens 30 has about 7 optical waveguides $O_1, \ldots, O_N$, i.e., N=7, the first OSCs have lengths and cylindrical coupling surface radii of about 790 micrometers, and the second OSCs have lengths and end cylindrical coupling surface radii of about 1530 micrometers. To avoid excessive ripple in optical filter responses, it may be preferable that the ends of the optical waveguides $OW_1, \ldots, OW_M$ of the AWGs subtend an angle of less than about $\lambda/b$ radians or less than about $\lambda/[b \cdot n]$ radians at the ends of the optical waveguides $O_1, \ldots, O_N$ of the AWG optical lens 30.

Figure 7:
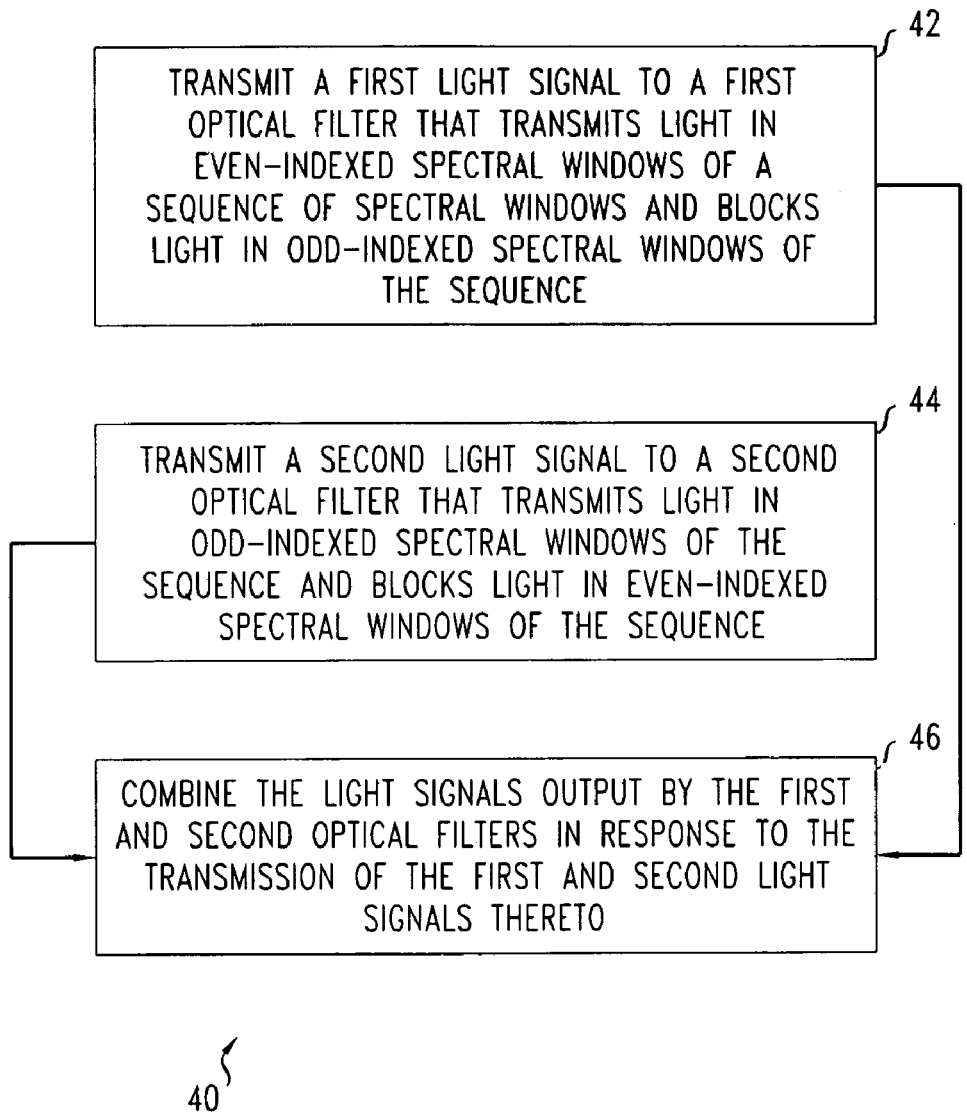
FIG. 7 is a flow chart illustrating a method of performing optical interleaving, e.g., with the apparatus of FIGS. 1, 4, and 5A-5B.

FIG. 7 illustrates a method 40 of optical interleaving, e.g., using the apparatus 10, 10A of FIGS. 1, 4, and 5A-5B.

The method 40 includes transmitting a first light signal to an optical input of a first optical filter, e.g., the optical port 16 of the apparatus 10, 10A illustrated in FIGS. 1 and 4 (step 42). The first light signal has a nonzero intensity in, at least, some odd-indexed spectral windows of a sequence and may or may not have substantially zero intensity in the even-indexed spectral windows of the sequence. The first optical filter substantially transmits light received in the set of odd-indexed spectral windows and substantially blocks light in a set of even-indexed spectral windows. In various embodiments, the spectral windows of the sequence may or may not have about the same width.

Here, the spectral windows of the sequence are consecutively indexed by a sequence of consecutive integers, wherein the indexing integer monotonically increases with the central wavelength of the spectral window. Adjacent ones of the spectral windows are also not substantially overlapping so that the even-indexed spectral windows are interleaved between the odd-indexed spectral windows.

The method 40 includes transmitting a second light signal to an optical input of a second optical filter, e.g., the optical port 18 of the apparatus 10, 10A illustrated in FIGS. 1 and 4 (step 44). The second optical filter substantially transmits light received in the even-indexed spectral windows of the sequence and substantially blocks light in the odd-indexed spectral windows of the sequence. The second light signal has a nonzero intensity in, at least, some even-indexed spectral windows and may or may not have substantially zero intensity in the odd-indexed spectral windows.

The method 40 includes intensity combining the light signals output by the first and second optical filters in response to transmitting the first and second light signals thereto at the steps 42 and 44 (step 46). The combining step 46 may be performed, e.g., by the 2×1 or 1×2 optical coupler 14 of the apparatus 10, 10A illustrated in FIGS. 1 and 4. Since the first optical filter only substantially outputs light in spectral windows that are interleaved with the spectral windows in which the second optical filter outputs light, the combining step 46 produces a combined light beam in which frequency portions of the first second light signal are optically interleaved with frequency portions of the second optical signal.

Figure 8:
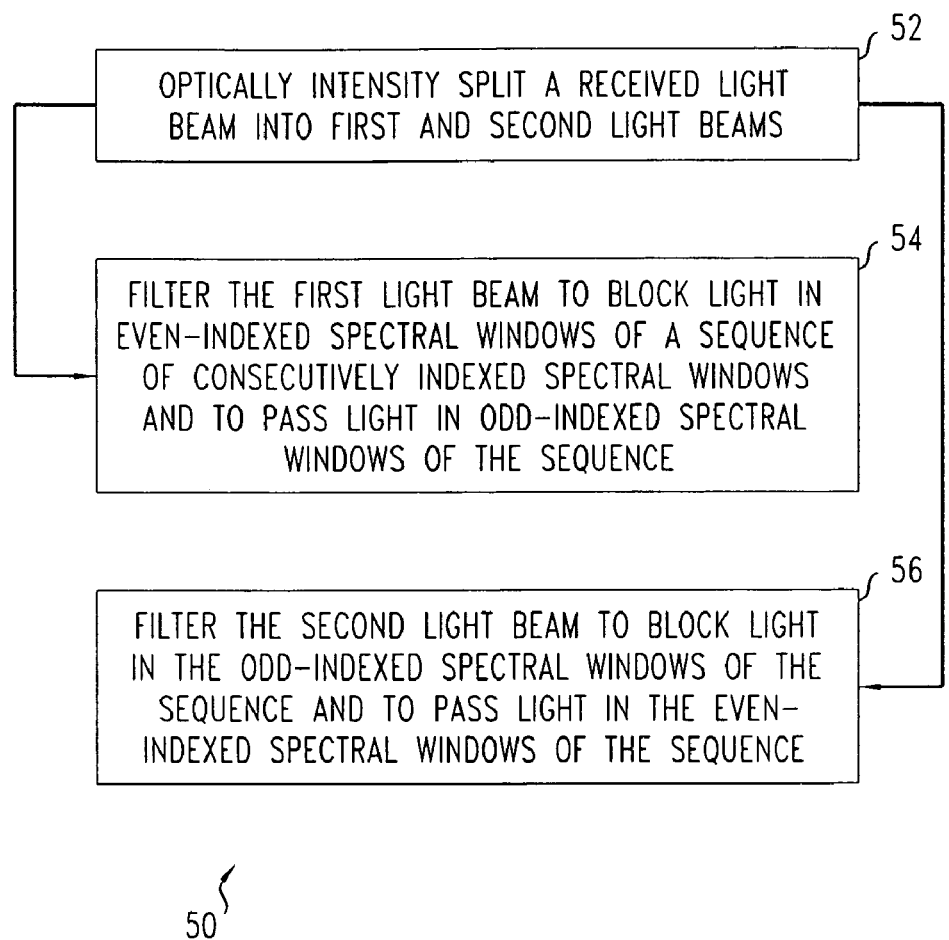
FIG. 8 is a flow chart illustrating a method of performing optical de-interleaving, e.g., with the apparatus of FIGS. 1, 4, and 5A-5B.

FIG. 8 illustrates a method 50 of performing optical de-interleaving, e.g., with the apparatus 10, 10A of FIGS. 1 and 4.

The method 50 includes optically intensity splitting a received light beam into first and second light beams with an optical intensity splitter (step 52). For example, the optically intensity splitting step 52 may involve receiving the light beam to-be-split at the optical port 24 of the 2×1 optical coupler 14 illustrated in FIGS. 1 and 4.

The method 50 includes filtering the first light beam from the optical intensity splitting step 52 to remove light in even-indexed spectral windows of a sequence of spectral windows and to substantially transmit light of odd-indexed spectral windows of the sequence (step 54). The filtering step 54 includes passing the first light beam through an optical filter that substantially removes or blocks light in the even-indexed spectral windows and substantially transmits light in the odd-indexed spectral windows. For example, this optical filter may be the first optical filter that has the optical ports 16, 20 as illustrated FIGS. 1 and 4.

As above, the spectral windows are consecutively indexed by a sequence of consecutive integers, and the indexing integer monotonically increases with the central wavelength of the spectral window. Adjacent ones of the spectral windows are also not substantially overlapping so that the even-indexed spectral windows are interleaved between the odd-indexed spectral windows of the sequence.

The method 50 includes filtering the second light beam from the optical intensity splitting step 52 to remove light in odd-indexed spectral windows of the sequence and to substantially transmit light in even-indexed spectral windows of the sequence (step 56). The filtering step 56 includes passing the second light beam through another optical filter that substantially blocks or removes light in the odd-indexed spectral windows and substantially transmits light in the even-indexed spectral windows of the sequence. For example, this other optical filter may be the second optical filter that has the optical ports 18, 22 as illustrated FIGS. 1 and 4.

In the method 50, the filter step 54 produces one of the frequency de-interleaved light beams, and the filtering step 56 produces the other of the frequency de-interleaved light beams.

Figure 9:
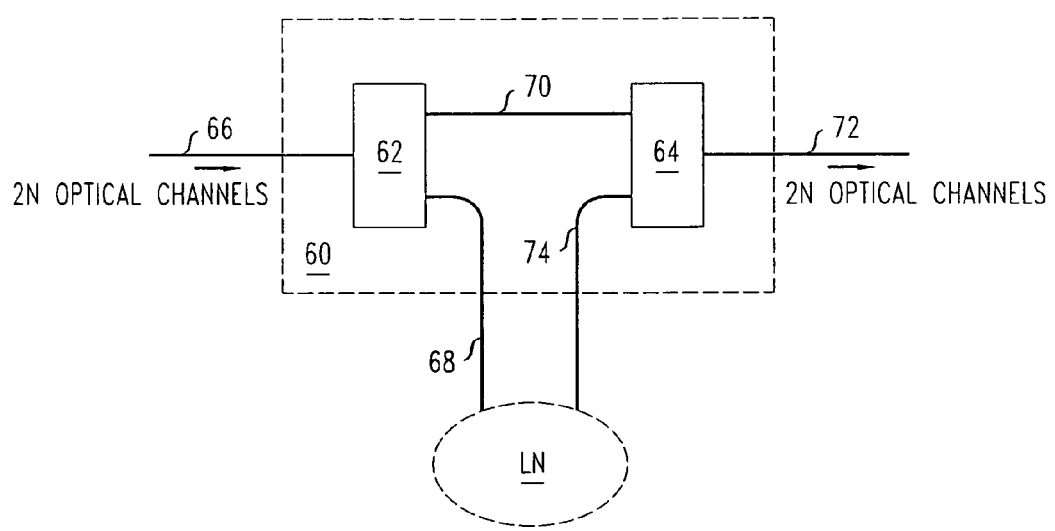
FIG. 9 is a block diagram of an embodiment of an optical add-drop multiplexer (OADM) that includes two optical interleavers, e.g., including one or more optical interleavers illustrated in FIGS. 1, 4, and 5A-5B.

FIG. 9 illustrates an example of an optical add-drop multiplexer (OADM) 60 that includes an optical de-interleaver 62 and an optical interleaver 64, e.g., either or both of said components may be the apparatus 10, 10A of FIGS. 1 and 4. The optical de-interleaver 62 optically connects to the termination end of a first optical transmission fiber 66 that transmits 2N adjacent wavelength channels to the OADM 60. The optical de-interleaver 62 drops received odd-indexed optical wavelength channels to a local node (LN) via an optical waveguide 68 and transmits the received even-indexed optical wavelength channels to the optical interleaver 64 via another optical waveguide 70. The optical interleaver 64 connects to an initial end of a second optical transmission fiber 72 that receives 2N adjacent wavelength channels from the OADM 60. The optical interleaver 64 receives light in the odd-indexed wavelength channels from the local node LN via an optical waveguide 74 and transmits light in received even-indexed and odd-indexed optical wavelength channels to the second optical transmission fiber 72. Thus, the OADM 60 drops the odd-indexed wavelength channels from the input optical transmission fiber 66 to the local node LN and adds the odd-indexed wavelength channels from the local node LN to the second optical transmission fiber 72 while transmitting the even-indexed wavelength channels from the first optical transmission fiber 66 to the second optical transmission fiber 72.

Figure 10:
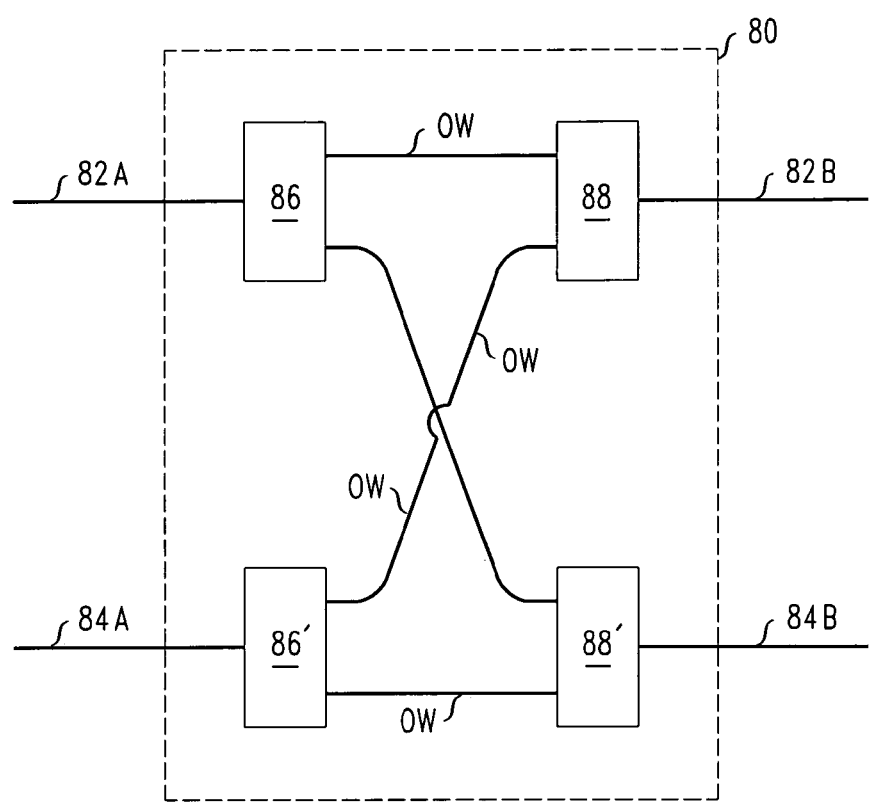
FIG. 10 is a block diagram of an embodiment of an optical cross-connect (OXC) that includes four optical interleavers, e.g., including one, two, or more optical interleavers as illustrated in FIGS. 1, 4, and 5A-5B.

FIG. 10 shows an example of an optical cross-connect (OXC) 80 between an upper optical transmission fiber 82a, 82b and a lower optical transmission fiber 84a, 84b. The OXC 80 includes optical de-interleavers 86, 86' and optical interleavers 88, 88', e.g., one, two, three, or all these optical components may be the apparatus 10, 10A illustrated in FIGS. 1 and 4.

Each optical de-interleaver 86, 86' receives light in a sequence of consecutive optical wavelength channels from an initial portion 82a, 84a of one of the optical transmission fibers (82a, 82b) or (84a, 84b). Each optical de-interleaver 86, 86' sends received light in the even-indexed optical wavelength channels to the corresponding optical interleaver 88, 88' so that said light is transmitted to the second portion 82b, 84b of the same optical transmission fiber (82a, 82b) or (84a, 84b). Each optical de-interleaver 86, 86' sends light in the odd-indexed optical wavelength channels to the non-corresponding optical interleaver 88', 88 so that said light is transmitted to the second portion of the crossed optical transmission fiber (84a, 84b) or (82a, 82b). These transfers of received light occur via optical waveguides OW and may include all-optical signal processing including optical amplification and/or optical dispersion compensation.

Each optical interleaver 88, 88' receives light from both optical de-interleavers 86, 86' via two of the optical waveguides OW. Each optical interleaver 88, 88' transmits the received light to the second portion 82b, 84b of the optical transmission fiber (84a, 84b) or (82a, 82b) that is optically connected thereto.

For the above-described reasons, the OXC is configured to interchange light on odd-indexed optical wavelength channels between the upper optical transmission fiber (82a, 82b) and the lower optical transmission fiber (84a, 84b).

Figure 11:
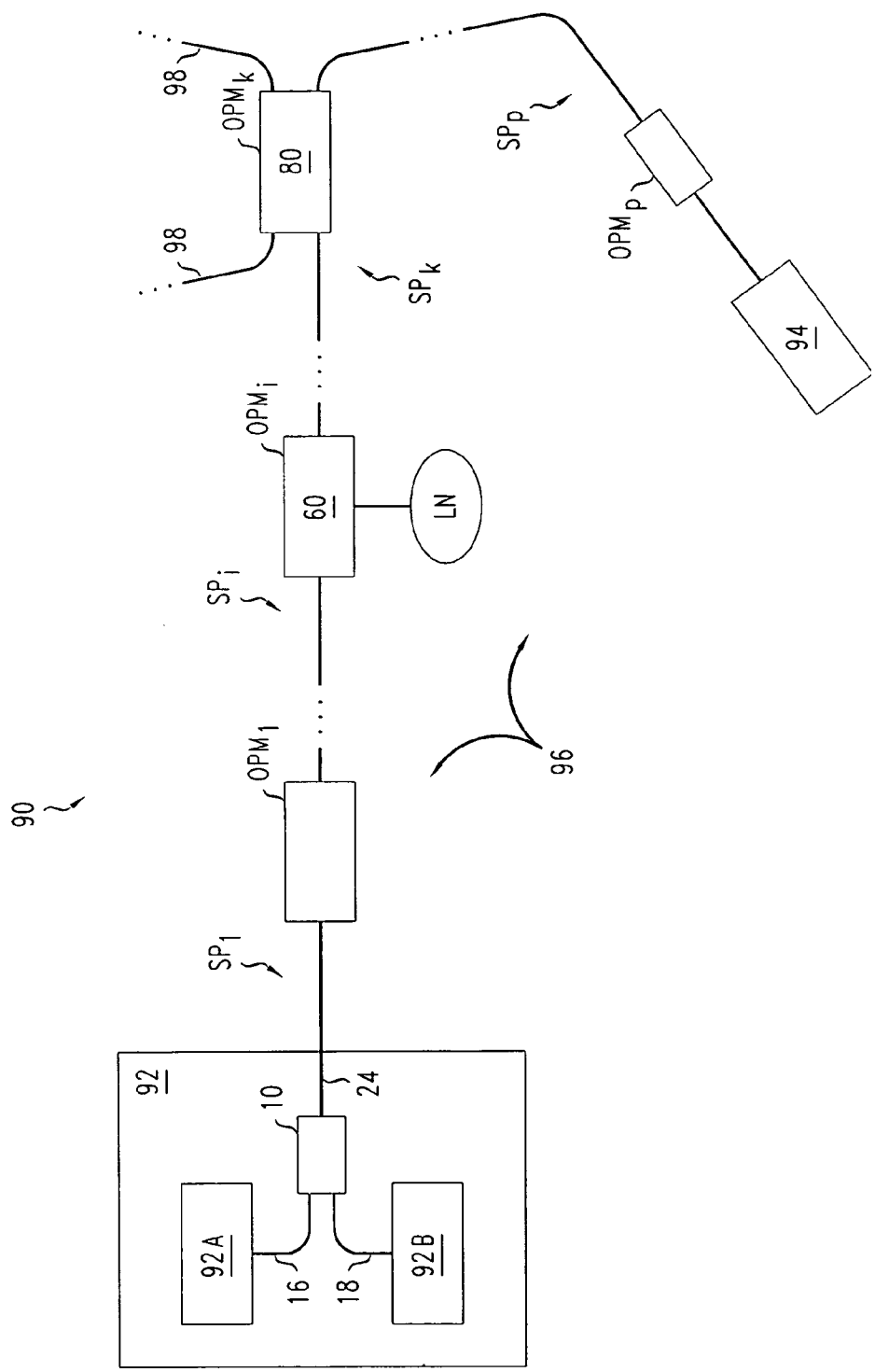
FIG. 11 is a block diagram of a multi-span fiber optical communication system that includes a transmitter, OADM(s), and/or OXC(s) with optical interleaver(s) as illustrated in FIGS. 1, 4, and/or 5A-5B, e.g., as illustrated in FIG. 9 and/or 10.

FIG. 11 illustrates an example of an optical communication system 90 that includes one or more OADMs and/or OXCs, e.g., the OADM 60 illustrated in FIG. 9 and/or the OXC 80 illustrated in FIG. 10. The optical communications system 90 includes an optical data transmitter 92, an optical data receiver 94, and a fiber optical transmission line 96.

The optical data transmitter 92 includes one or more optical transmitters 92A, 92B. In embodiments with multiple one or more optical transmitters 92A, 92B, the optical transmitter 92 may include an optical combiner to combine the optical data streams from the optical transmitters 92A, 92B, e.g., data streams on different wavelength channels. The optical combiner may include the apparatus 10 illustrated in FIG. 1 to interleave light on even wavelength channels of a sequence from the optical transmitter 92A with light on odd wavelength channels of the sequence from the optical transmitter 92B.

The fiber optical transmission line 96 has a sequence of P spans $SP_1, \ldots, SP_i, \ldots, SP_k, \ldots, SP_P$ of optical transmission fiber that optically connect the optical data transmitter 92 to the optical data receiver 94. The spans $SP_i, \ldots, SP_P$ of optical transmission fiber are end-coupled by all-optical processing modules $OPM_1, \ldots, OPM_i, \ldots, OPM_k, \ldots, OPM_P$ that may perform, e.g., optical amplification and/or optical dispersion compensation, etc. One or more of the all-optical processing modules $OPM_i$, $OPM_j$ also function as an OADM or an OXC thereby supporting dropping of wavelength channels to local nodes LN or to other optical fiber transmission lines 98 and the adding of optical wavelength channels therefrom to the fiber optical transmission line 96. Such all-optical processing modules $OPM_j$, $OPM_k$ may include the OADM 60 of FIG. 9 and/or the OXC 80 of FIG. 10.

The invention is intended to include other embodiments that would be obvious to one of skill in the art in light of the description, figures, and claims.

What I claim is:

1. An apparatus comprising:
one or more optical de-interleavers, each optical de-interleaver comprising:
an optical component having a first pair of optical input and output ports and a second pair of optical input and output ports; and
a 1×2 optical coupler, each optical output port of the optical component being optically connected to a corresponding optical port of the 1×2 optical coupler; and
wherein the optical component is constructed to operate as a first optical filter for light propagating between the optical ports of the first pair and is constructed to operate as a second optical filter for light propagating between the optical ports of the second pair, the first and second optical filters having substantially regularly spaced and interleaved passbands.

2. The apparatus of claim 1, wherein the 1×2 optical coupler is capable of operating as an optical intensity splitter.

3. The apparatus of claim 1, wherein the optical component includes an AWG optical MUX capable of transmitting light from two optical ports thereof to an array of ends of optical waveguides end-coupled to an optical star coupler of the AWG optical MUX.

4. The apparatus of claim 3, wherein the optical component includes another AWG optical MUX capable of transmitting light from other ends of the optical waveguides of the array to two optical ports of the another AWG optical MUX.

5. The apparatus of claim 3, wherein the AWG optical MUX includes another optical star coupler and an AWG connecting the two optical star couplers, the array of ends of the optical waveguides being located on the surface to receive light from less than or equal to about half of the frequency band corresponding to one diffraction order of the AWG.

6. The apparatus of claim 3, wherein the AWG optical MUX includes another optical star coupler and an AWG connecting the two optical star couplers, the array of ends subtending a maximal angle with respect to ends of optical waveguides of the AWG, the maximal radian angle being less than or equal to about 1.55 micrometers divided by twice an average center-to-center spacing of the ends of the optical waveguides of the AWG in micrometers and divided by the effective refractive index of the waveguides of the AWG.

7. The apparatus of claim 1, further comprising an optical cross connect or an optical add drop multiplexer including the one or more optical de-interleavers, the one or more optical de-interleavers including two optical de-interleavers.

8. The apparatus of claim 7, comprising a multi-span optical fiber transmission line, the line comprising the optical cross connect or optical add drop multiplexer.

9. An apparatus comprising:
a first AWG optical MUX including an array of optical ports coupled to two optical ports;
a second AWG optical MUX including an array of optical ports coupled to two optical ports, the optical ports of the arrays of the first and second AWG optical MUXs being connected in a one-to-one manner; and
a 2×1 optical coupler having a first optical port connected to one of the two optical ports of the first AWG optical MUX and having a second optical port connected to the other of the two optical ports of the first AWG optical MUX.

10. The apparatus of claim 9, wherein the first and second AWG optical MUXs are connected such that passbands for light propagating between a first of the two optical ports of the second AWG optical MUX and a first of the two optical ports of the first AWG optical MUX interleave between passbands for light propagating between a second of the two optical ports of the second AWG optical MUX and a second of the two optical ports of the first AWG optical MUX.

11. The apparatus of claim 9, further comprising an optical cross connect or an optical add drop multiplexer including the first and second AWG optical MUXs and the 2×1 optical coupler.

12. The apparatus of claim 11, comprising a multi-span optical fiber transmission line, the multi-span optical transmission fiber line comprising the optical cross connect or optical add drop multiplexer.

13. A method comprising:
transmitting a first light signal to an optical input of a first optical filter;
transmitting a second light signal to an optical input of a second optical filter; and
combining the light signals output by the first and second filters in response to the transmission of the first and second light signals thereto; and
wherein the first optical filter substantially blocks light in even-indexed spectral windows of a sequence of consecutively indexed adjacent spectral windows and transmits light odd-indexed windows of the sequence and the second optical filter substantially blocks light in the odd-indexed spectral windows of the sequence and transmits light in the even-indexed windows of the sequence.

14. The method of claim 13, wherein the first light signal has a nonzero intensity in some of the odd-indexed spectral windows of the sequence and the second light signal has a nonzero intensity in ones of the even-indexed spectral windows interleaved with the some of the odd-indexed spectral windows.

15. The method of claim 13, wherein the spectral windows have substantially equal widths.

16. The method of claim 13, wherein the first and second transmitting steps include transmitting the light signals through a same serially concatenated pair of AWG optical MUXs.

17. A method, comprising:
intensity splitting a received light beam into first and second light beams with an optical intensity splitter;
filtering the first light beam to remove light in a set of even-indexed spectral windows of a sequence therefrom and to pass light in some of odd-indexed spectral windows of the sequence; and
filtering the second light beam to remove light in the odd-indexed spectral windows of the sequence therefrom and to pass light in some of the even-indexed spectral windows of the sequence; and
wherein the even-indexed and odd-indexed spectral windows form a sequence of consecutively-indexed adjacent spectral windows and the some of the even-indexed spectral windows are interleaved with the some of the odd-indexed spectral windows.

18. The method of claim 17, wherein different ones of the spectral windows have about the same frequency-width.

19. The method of claim 17, wherein the filtering steps include transmitting the first and second light beams to a same serially concatenated pair of AWG optical MUXs.

* * * * *